United States Patent [19]

Coulon et al.

[11] 4,246,700

[45] Jan. 27, 1981

[54] APPARATUS FOR CUTTING OUT AND EXTRACTING THE PULP OF A FRUIT OR VEGETABLE WITHOUT RUINING ITS PEEL OR RIND

[76] Inventors: Serge Coulon, 46, Cours des Dames, 17000 La Rochelle; Louis Amour, 54, rue Pasteur, 44340 Bouguenais, both of France

[21] Appl. No.: 25,741

[22] Filed: Mar. 30, 1979

[30] Foreign Application Priority Data

Apr. 5, 1978 [FR] France ............................. 78 10990
Feb. 21, 1979 [FR] France ............................. 79 04457

[51] Int. Cl.³ ........................... A47J 25/00; B26B 3/00
[52] U.S. Cl. ........................................ 30/300; 99/544; 99/545
[58] Field of Search ................ 99/505, 515, 538–545, 99/547, 593; 30/113.1, 113.3, 130, 117, 300–302; 83/651.1; 408/195, 200

[56] References Cited

U.S. PATENT DOCUMENTS

| 185,822 | 1/1877 | Eveleth et al. | 30/300 |
| 1,042,823 | 11/1912 | Richard | 30/113.3 |
| 1,182,629 | 5/1916 | Birnbaum | 30/113.3 |
| 1,568,008 | 12/1925 | Thomas | 30/302 |
| 3,540,503 | 11/1970 | McNair | 99/544 |

Primary Examiner—Harvey C. Hornsby
Assistant Examiner—Timothy F. Simone
Attorney, Agent, or Firm—Berman, Aisenberg & Platt

[57] ABSTRACT

A device for cutting out and extracting the pulp from a vegetable or fruit, particularly a pineapple, while leaving the peel or rind intact for later use. The device has a central coring tube depending from a handle and secured for rotation therewith. The coring tube enables the pulp to be severed from the hard, fibrous core of the fruit or vegetable as it is displaced axially. A vertically cutting blade also depends from the handle and is spaced radially from the axis of the device so that as the handle is rotated the cutting blade describes a cylindrical cut adapted to sever the pulp from a shell including the peel or rind. The device also comprises one or more radial cutting blades extending from the coring tube to the radial position of the vertical cutting blade depending on whether a cylindrical mass of pulp is desired or rather a stack of slices. A plurality of radial blades may be fixed to the coring tube. Alternatively a single radial cutting blade may be secured at one of several positions along the coring tube. Also, a swivelly mounted radial blade may be journalled in the coring tube and the vertical cutting blade to vertically section during axially penetration and horizontally cut as the handle is rotated.

6 Claims, 7 Drawing Figures

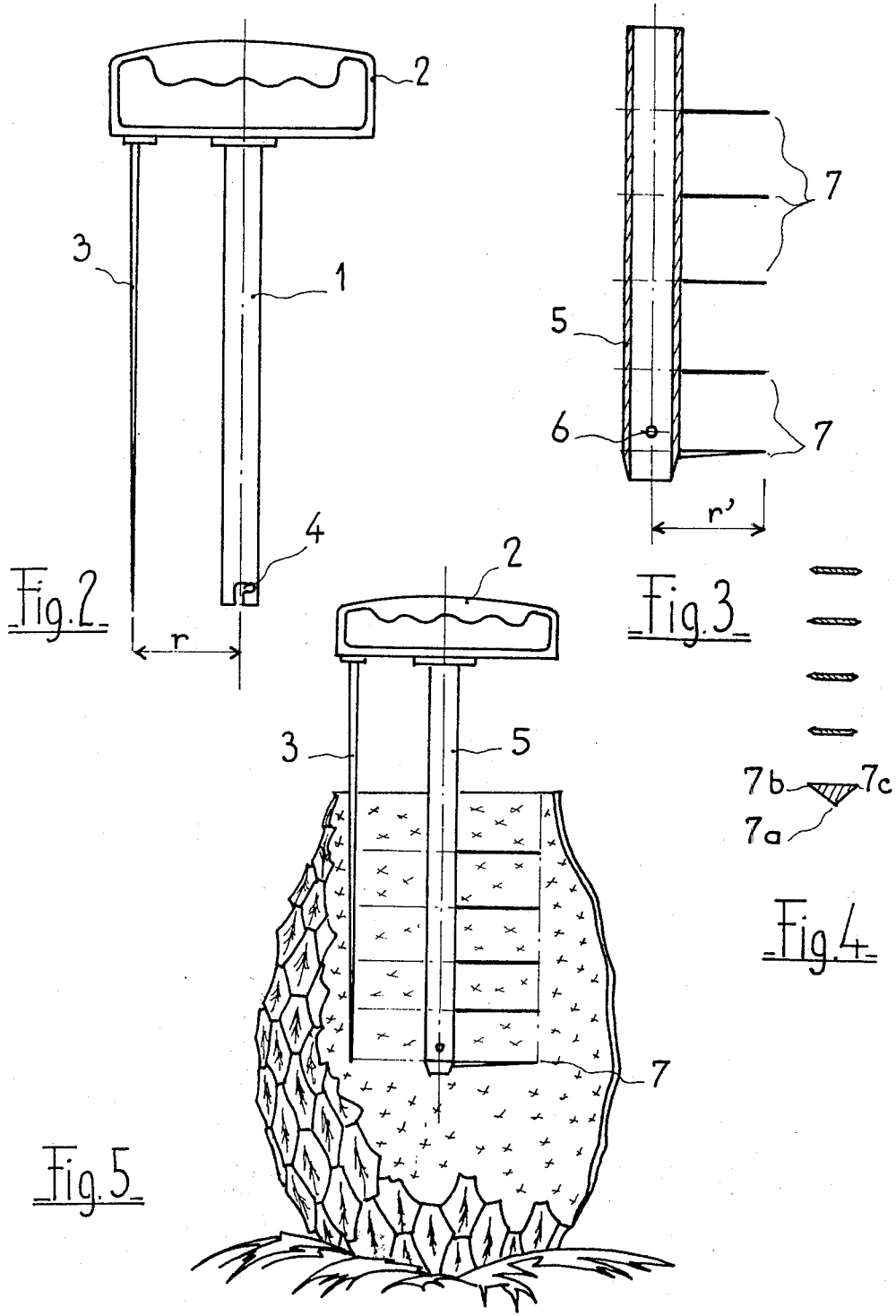

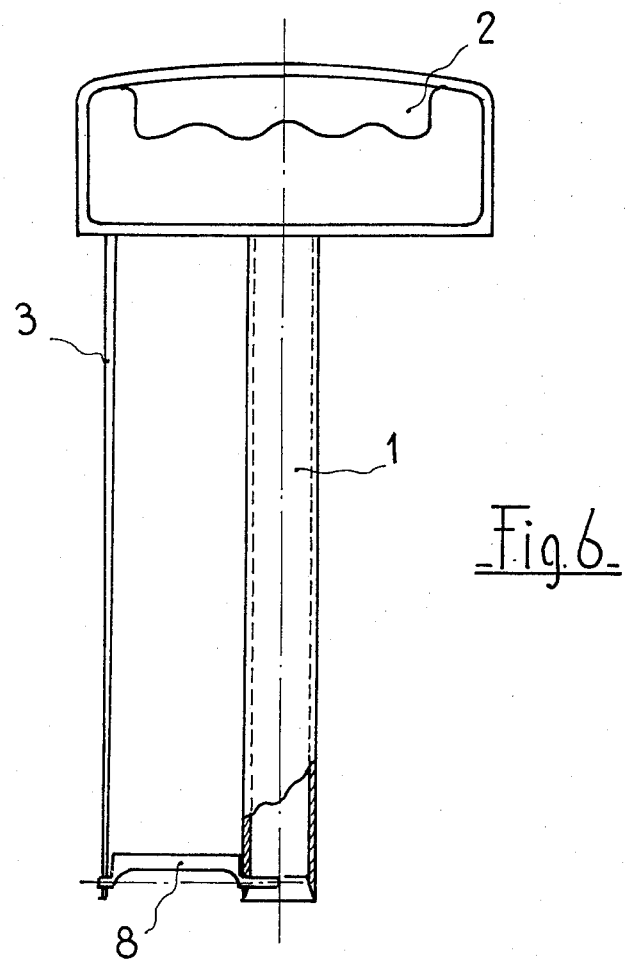
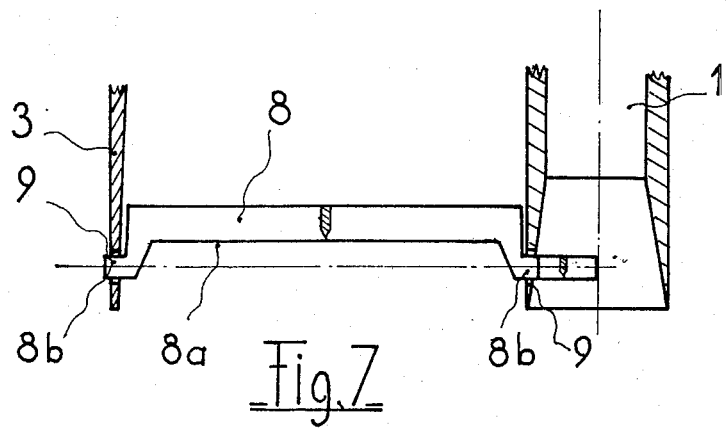

4,246,700

APPARATUS FOR CUTTING OUT AND EXTRACTING THE PULP OF A FRUIT OR VEGETABLE WITHOUT RUINING ITS PEEL OR RIND

FIELD OF THE INVENTION

The present invention relates to a device for cutting out and extracting the pulp or flesh of a fruit or vegetable, particularly a pineapple from peel or rind.

BACKGROUND OF THE INVENTION

Up to now to extract the edible part of a pineapple for immediate consumption, generally the fruit is sectioned longitudinally to form quarters. It is also known to cut the fruit into transverse slices after separating the pulp from the peel and removing the hard or fibrous central section or core with a view to preserving the pulp. All these operations are carried out manually and have the drawback of being time-consuming if all traces of the peel are to be perfectly removed.

There has been proposed in French printed patent application No. 2,358,839 a device comprising two concentric cylindrical blades. The inner cutting blades separates the pulp or flesh from the core, and the outer blade separates the peel from the pulp or flesh. This device operates by blades traversing the mass of the pineapple, including the end of the peel which is remote from the end where the blades enter the pineapple, and latter end must then be removed manually. Further, the remainder of the peel removed forms a sort of open-ended tube which is unusable. Moreover, known methods do not permit part of the fruit to be kept in its peel after only part of its pulp or flesh has been removed.

SUMMARY OF THE INVENTION

The device according to the invention permits all or part of the pulp or flesh of a fruit, such as a pineapple, to be extracted by severing both the hard, fibrous core and the peel at the same time, while leaving intact the peel, which may then be used as a receptacle.

The invention provides a device for cutting out and extracting the flesh or pulp of a fruit or vegetable from its peel or rind without ruining the latter, the device comprising an operating shank carried by a handle and adapted to rotate a tube having a cutting edge, cutting means carried by the handle and located at a distance from the tube and adapted to sever the pulp from a shell including the peel or rind, and at least one radial cutting blade carried by the tube adapted to cut the pulp in at least a plane perpendicular to the axis of the tube as the latter revolves around its axis.

Preferably the cutting means for severing the pulp from the shell (including the peel or rind) comprises a vertical steel cutting blade extending parallel to the operating shank with its pointed tip remote from the handle.

The lower end of the coring tube is sharpened so as to cut out the central core or section circularly as it penetrates vertically, the radial blade (fitted on the tube) cutting through the pulp along a vertical cutting plane. After the tube has penetrated to the depth corresponding to the mass of pulp to be extracted, it suffices to rotate the tube one complete revolution so that the radial blade describes a horizontal cutting plane. The rotation is effected by means of the handle fitted on the vertical operating shank which drives the tube which in turn rotates the radial blade which is fixed for rotation therewith. During the rotation the cutting means (adapted to sever the pulp from a shell, including the peel or rind) describes a right cylindrical cut. The vertical withdrawal of the operating shank and tube assembly permits the extraction of the pulp in a cylindrical mass. In case the coring tube comprises a series of radial cutting blades at regularly spaced intervals along its length, the cylindrical mass of pulp extracted may be cut into a corresponding number of annular slices.

According to an interesting alternative embodiment the position of the radial blade is adjustable which enables slices of the desired height to be cut. For example, the radial cutting blade is mounted on a support adapted to slide along the tube and means are provided for securing the support at at least one predetermined longitudinal position along the tube as the tube is rotated around its axis.

The accompanying drawings illustrate, by way of example, two embodiments of the device according to the invention.

BRIEF DESCRIPTION OF THE DRAWINGS

FIG. 2 shows an elevational view of the vertical operating shank of the device;

FIG. 3 shows a curing sleeve or tube;

FIG. 4 shows cross sections of cutting blades or rods fitted on the coring tube or sleeve;

FIG. 5 illustrates the cutting operation of the device for extracting a cylindrical mass of pulp from a pineapple;

FIG. 6 illustrates an alternative embodiment in elevational view;

FIG. 7 illustrates a detailed view of the radial cutting blade fitted on the embodiment of FIG. 6.

DESCRIPTION OF PREFERRED EMBODIMENTS

Figure 1:
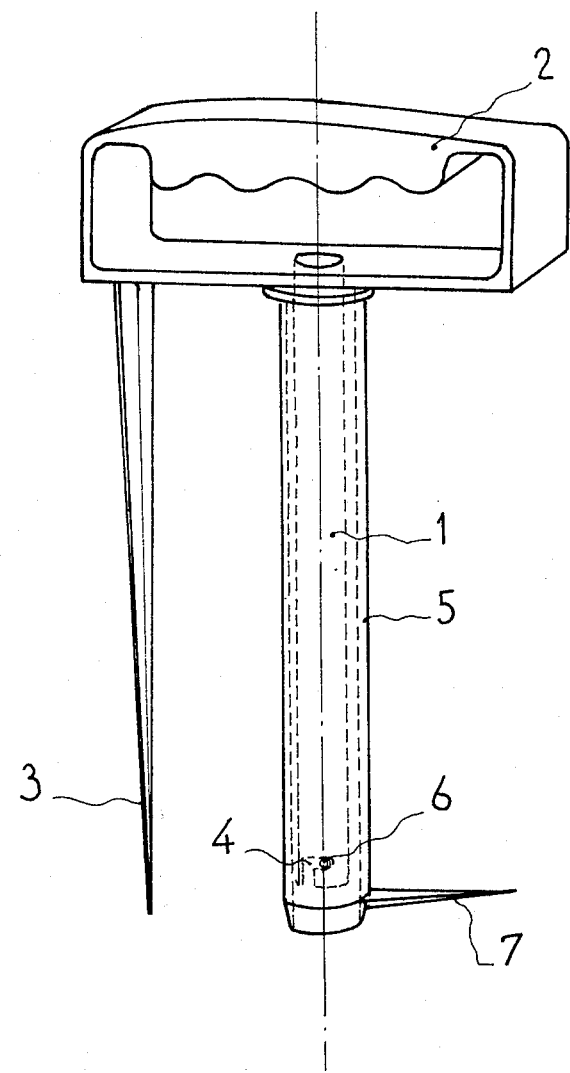
FIG. 1 represents an isometric projection of a first embodiment of the device embodying the invention.

As illustrated in FIG. 1, the device comprises a vertical central operating shank 1 formed as a hollow tube having a handle 2 at its upper end, beneath which is a steel cutting blade 3 with its pointed tip at its lower end remote from the handle and extending parallel to the vertical axis of the operating shank. The length of the blade 3 approximately corresponds to the average height of graded pineapples on the market. Similarly, the distance r between the pointed tip or lower end of the cutting blade 3 from the vertical axis of the device approximately corresponds to the outer radius of the edible part or pulp of the pineapple. The lower end of the operating shank 1 comprises a slot 4 of a bayonet joint in order to effect the locking of the operating shank with the hollow cylindrical tube or sleeve 5 in which it is fitted. At the lower end of the cylindrical tube or sleeve 5 is a diametrical pin cooperable with the bayonet slot in the cylindrical operating shank 1. The lower end edge of the cylindrical tube or sleeve is sharpened thereby defining a sort of coring tube or sleeve for coring or cutting out the central fibrous section or core of the fruit as it penetrates vertically therein. The cylindrical tube or sleeve 5 comprises at its lower end one or more radially oriented cutting blades or rods 7 depending on whether a single cylindrical mass of pulp is to be extracted or rather a stack of pulp slices. In case a plurality of radial cutting blades or rods 7 are provided, they are disposed at regularly spaced intervals along a generatrix running the entire axial length of the cylindrical tube or sleeve 5. The radial projection r' of the pointed tip of each blade 7 corresponds to the distance r from the pointed tip of the cutting blade 3 to the geometrical axis of the device.

The cross section of the radial blade 7 located farthest to the handle and closest to the lower end of the sleeve or tube 5 is a triangle with its right angle pointed downwards so as to form a cutting edge 7a for cutting the pulp along a vertical radial plane during the insertion of the sleeve or tube 5 into the pineapple. The other two edges 7b and 7c permit the cutting of the pulp along a horizontal plane during the rotation of the sleeve or tube 5. In case the sleeve or tube is provided with a plurality of radial blades 7, the other blades have a narrow cross section arranged horizontally with sharpened lateral edges. The width of these blades is not greater than the base of the right triangular cross section of the lowermost blade 7. These blades serve solely for slicing pulp along horizontal cutting planes and do not come into action during the vertical cutting out of the pulp.

The device may be equipped with a set of two sleeves or tubes, the radial projection r' of the blades being different to correspond to two different size fruits. Likewise, the device may be provided with means for adjusting the radial projection r' of the blades 7 as well as the radial distance between the vertical blade 3 and the geometrical axis of the device.

The cutting out and extraction of the pulp of the fruit occurs in the following manner. The coring tube or sleeve 5 is introduced by vertical translation in the central section or core of the fruit to the desired depth (corresponding to the mass of pulp to be extracted), the translatory movement of the device through the fruit shearing the central section or core and a shell (including the peel or rind) from the pulp. The lowermost blade or rod 7 traverses the pulp in the course of its path of movement along a vertical radial plane. The central operating shank 1 is then introduced into the coring sleeve or tube 5, thereby causing the blade 3 to penetrate into the fruit, either by translation alone or by translation and rotation depending on the hardness of the fruit impeding the penetration of the blade 3. At the end of vertical translation of the device to the base of the fruit, the diametrical pin 6 on the coring sleeve or tube locks into the bayonet slot in the operating shank 1. Then by one full revolution of the handle the pulp of the fruit is cut out in the form of a cylindrical mass by cutting blade 3 and a radial blade 7 along one or more horizontal cutting planes by rotation of blade 3 and of blades 7. The pulp is then in a single cylindrical mass or a stack of cylindrical slices of equal thickness. The actual extraction is effected by translating the assembly of the sleeve or tube, and the operating shank vertically, the blade(s) or rod(s) 7 retaining the pulp in the course of this upward vertical translation.

The invention may admit of certain modifications with respect to the embodiment which has just been described.

Thus the relative positions of the sleeve or tube and the operating shank may be reversed, the coring sleeve or tube then being located inside the operating shank.

Figure 8:
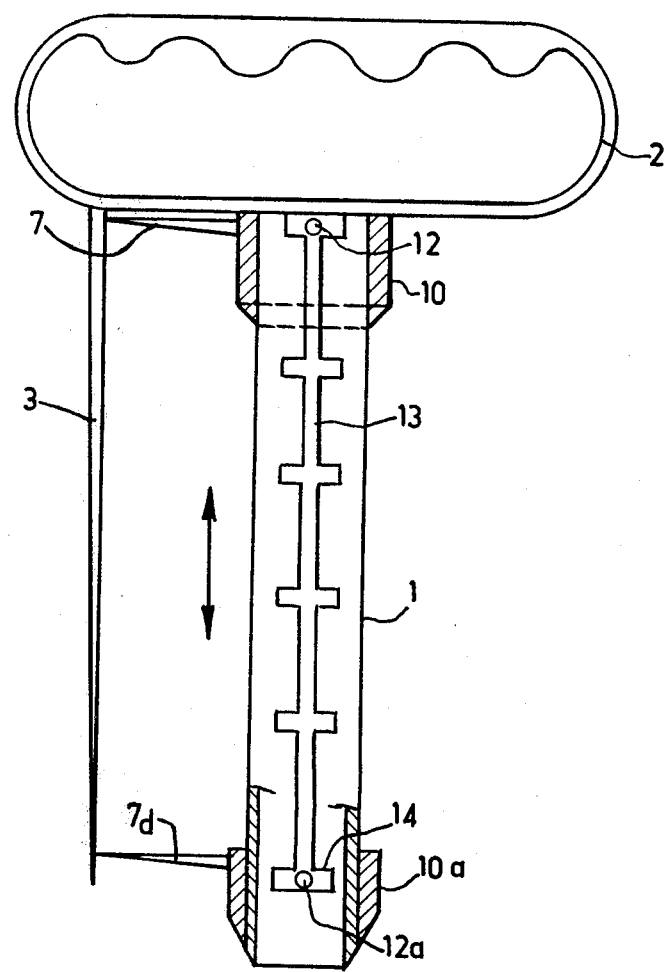
FIG. 8 illustrates in elevational view another alternative embodiment.

Likewise the device may not even have a separate sleeve or tube, the tubular central operating shank also serving as the coring sleeve or tube and having for this purpose a sharpened edge at its lower end (see FIGS. 6 to 8). The means for severing the base of the mass of pulp to be removed along a horizontal plane consists of a swivelling blade 8. This blade has a thin cross section with its cutting edge 8a being formed by a single or double bevel. This cutting edge 8a is thus offset from its swivel axis defined by the two journals 8b formed at its ends, which journals are received in holes formed opposite each other along a horizontal axis in the blade 3 and in the operating shank coring tube or sleeve 1. The edge 8a is connected to the journals by two inclined portions which also have a cutting function. The vertical force exerted on the handle automatically swings the blade 8 into position so that its cutting edge may engage the pulp along a vertical radial cutting plane as shown in FIG. 6. Once the device reaches the desired depth the force of rotation exerted on the handle automatically orients the cutting edge to operate in a horizontal plane. Blade 3 and operating shank-coring tube or sleeve 1 may each be provided with a series of holes 9 in order to equip the apparatus with a corresponding number of blades 8 in order to cut the mass of pulp into horizontal slices. The journal on the blade that is received in the operating shank-coring tube or sleeve 1 may be extended well inside the latter up to the geometrical axis of the device by a cutting edge adapted to sever the base of the fibrous core.

FIG. 8 is another, particularly interesting alternative embodiment because it permits the force required for severing the cylindrical mass of pulp to be reduced.

The device comprises an operating shank 1 formed as a hollow tube which therefore also constitutes the coring sleeve or tube 5, its lower edge being sharpened, a handle 2 beneath which is mounted a steel cutting blade 3 with its pointed tip at its lower end remote from the handle and extending parallel to the tube or sleeve 1. The cutting blade 3 is adapted to sever the shell (including the peel or rind) from the pulp, that is to say, its cutting edges are in a plane tangent to the cylinder which it describes when the device is rotated.

A radial cutting blade is illustrated in FIG. 8 in both its raised position (reference 7) near the handle and its lowered position (reference 7d). This cutting blade comprises a downwardly directed cutting edge and at least another cutting edge disposed in a plane perpendicular to the axis of the operating shank-coring tube or sleeve 1. The length of the radial cutting blade is such that it reaches the blade 3. The blade 7 is carried by a support 10 (raised position) 10a (lower position) formed as a tubular section with its chamfered edge facing downwards and slidable along the operating shank-coring tube 1. The support 10, 10a comprises an internal lug 12 (raised position), 12a (lowered position) slidable in a longitudinal groove 13 in the operating shank-coring tube 1.

The groove 13 comprises notches 14 at various heights, a revolution of the operating shank-coring tube 1 about itself when the lug 12, 12a is level with a notch cases the lug to enter the notch and prevents the displacement of the support and the cutting blade along the operating shank-coring tube 1.

The operation of the device is as follows.

To start with the blade 7 is in its raised position, closest to the handle, the device is pushed into the fruit and then it is rotated around the axis of the operating shank-coring tube 1. Thus two cylindrical cuts are produced severing the pulp from the hard central core and from the shell (including the peel or rind). The device or utensile is then withdrawn and the lug 12 is placed in one of the notches 14 located at a greater distance from the handle. The device or utensil is once again pushed into the fruit, the operating shank-coring tube 1 and the cutting blade 3 are inserted into the cut they originally made. The blade 7 makes a radial cut, then when the desired depth is attained, the device is rotated around the axis of the operating shank-coring tube 1 whereby the blade 7 forms a cut perpendicular to the axis. A cylindrical mass of pulp of the desired height is thus cut out and totally separated and extracted from the remaining shell without any difficulty.

Without departing from the scope of the invention, the various component parts of the above-described device, such as the coring sleeve or tube 5 and the blade 3, may be designed as accessories adapting themselves to certain pre-existing devices, such as food processors or mixers.

Amongst other advantages, the device makes it possible to avoid ruining the peel or rind which may, after the pulp has been removed, be utilized as a serving piece for a dessert or other dish, e.g. fruit salad, of which the pulp of the fruit may be an ingredient.

What is claimed is:

1. A device for cutting out and extracting pulp of a fruit or vegetable, having an outer shell (including its peel or rind), a base and a central core, without severing the base from the rest of the outer shell, the device comprising a coring tube or sleeve having a cutting edge for severing the central core of the fruit or vegetable from its pulp, a shank having a handle on one end and carrying or integral with the coring tube or sleeve for rotation with the handle, cutting means (carried by said handle and spaced from said tube or sleeve) for severing the pulp from the outer shell (including the peel or rind) and a radial cutting blade carried by said coring tube or sleeve and adapted for optional placement in inoperative position or in position to cut the pulp on at least one plane perpendicular to the axis of the coring tube or sleeve as said coring tube or sleeve is rotated about its axis.

2. A device according to claim 1 wherein the radial cutting blade has a horizontal cutting edge.

3. A device according to claim 1, wherein one said radial blade has a triangular cross section with one angle pointing away from said handle and cutting edges for sectioning said pulp a along a vertical plane as said coring tube or sleeve penetrates parallel to the axis and b along a horizontal plane as said coring tube or sleeve is rotated about the axis.

4. A device according to claim 1, wherein said radial cutting blade is fixed on a support slidably mounted on said coring tube or sleeve, further comprising means for securing said support at at least one predetermined position along the length of said coring tube or sleeve for rotation with said coring tube or sleeve about its axis.

5. A device according to claim 4, said coring tube or sleeve having a longitudinal groove and said support for said radial cutting blade comprises a lug received in said longitudinal groove in said coring tube or sleeve, said longitudinal sleeve having at least one notch corresponding to said at least one predetermined position for cooperating with said lug to secure said support in position.

6. A device according to claim 1, wherein said means for severing a shell (including the peel or rind) from the pulp comprises a cutting blade with a pointed tip directed away from said handle.

* * * * *